United States Patent
Su (10) Patent No.: US 9,229,152 B2
(45) Date of Patent: Jan. 5, 2016

(54) INFORMATION EXHIBITION SYSTEM

(71) Applicant: Lextar Electronics Corporation, Hsinchu (TW)

(72) Inventor: Wen-Lung Su, Hsinchu County (TW)

(73) Assignee: LEXTAR ELECTRONICS CORPORATION, Hsinchu (TW)

( * ) Notice: Subject to any disclaimer, the term of this patent is extended or adjusted under 35 U.S.C. 154(b) by 234 days.

(21) Appl. No.: 14/028,550

(22) Filed: Sep. 17, 2013

(65) Prior Publication Data

US 2014/0232968 A1    Aug. 21, 2014

(30) Foreign Application Priority Data

Feb. 19, 2013    (TW) .............................. 102105731 A (51) Int. Cl.
| | |
|---|---|
| *G02F 1/1335* | (2006.01) |
| *F21V 8/00* | (2006.01) |
| *F21V 33/00* | (2006.01) |

(52) U.S. Cl.
CPC .......... *G02B 6/0063* (2013.01); *F21V 33/0012* (2013.01); *F21V 33/0052* (2013.01); *G02B 6/0068* (2013.01); *G02B 6/0073* (2013.01)

(58) Field of Classification Search
CPC ..................... G02F 1/133615; G02F 1/133603
See application file for complete search history.

(56) References Cited

U.S. PATENT DOCUMENTS

2009/0076650 A1*    3/2009   Faes .............................. 700/232

FOREIGN PATENT DOCUMENTS

TW                M425975 U1       4/2012

* cited by examiner

*Primary Examiner* — Phu Vu
(74) *Attorney, Agent, or Firm* — CKC & Partners Co., Ltd.

(57) ABSTRACT

An information exhibition system includes an exhibition cabinet and a least one information display device. The exhibition cabinet is used to exhibit at least one object. The information display device is positioned on the exhibition cabinet. The information display device includes a display panel and an illumination module. The display panel includes a front surface and a back surface opposite to the front surface. The front surface shows information. The illumination module is positioned on the back surface of the display panel, so that the light can be emitted into the display panel through the back surface and also illuminate the object on the backside of the display panel.

12 Claims, 7 Drawing Sheets

INFORMATION EXHIBITION SYSTEM

RELATED APPLICATIONS

This application claims priority to Taiwan Application Serial Number 102105731, filed Feb. 19, 2013, which is herein incorporated by reference.

BACKGROUND

1. Technical Field

Embodiments of the present invention relate to an information exhibition system.

2. Description of Related Art

A typical commodity exhibition cabinet includes a plurality of shelf boards. Commodities can be exhibited on each shelf board. In order to make the viewer to receive the information of the commodity, some manufacturers install a display in front of the shelf board to show the commodity information. Further, some manufacturers install a lamp or other illumination devices to emitting a light to the commodity, so that the viewer can see the commodity more clearly. However, the display and the illumination device both require electricity. When the commodity exhibition cabinet includes both the display and the illumination device, the power consumption is considerably high.

SUMMARY

An exhibition cabinet having both the information exhibition ability and the illumination ability in lower power consumption is provided.

In accordance with one embodiment of the present invention, an information exhibition system includes an exhibition cabinet and an information display device. The exhibition cabinet is used to exhibit at least one object. The information display device is positioned on the exhibition cabinet. The information display device includes a display panel and an illumination module. The display panel has a front surface and a back surface opposite to the front surface. The front surface is used to show information. The illumination module is positioned on the back surface of the display panel for emitting a light into the display panel through the back surface and illuminating the object on the backside of the display panel.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Figure 1:
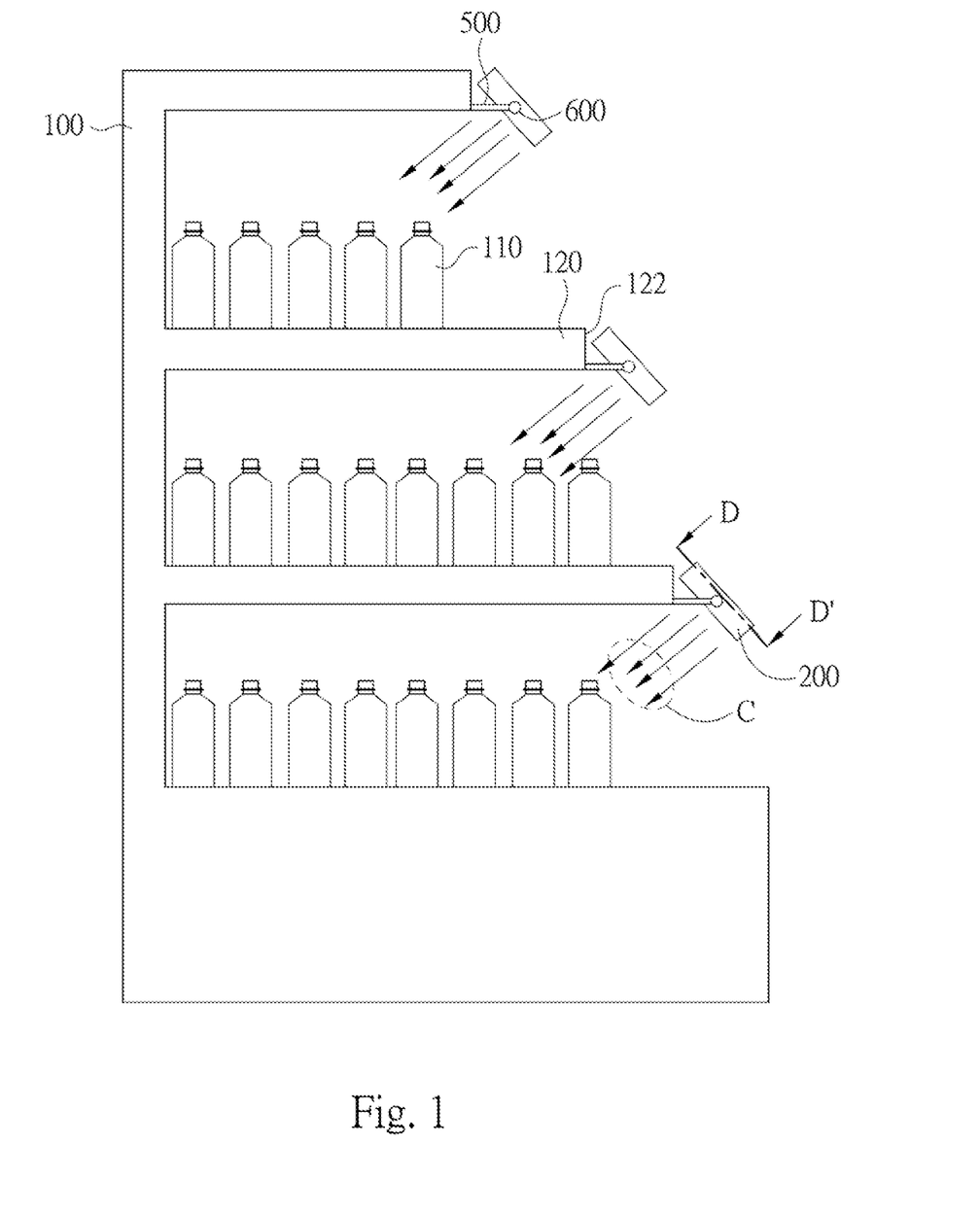
FIG. 1 is a side view of an information exhibition system in accordance with one embodiment of the present invention.

FIG. 1 is a side view of an information exhibition system in accordance with one embodiment of the present invention. As shown in FIG. 1, the information exhibition system includes an exhibition cabinet 100 and an information display device 200. The exhibition cabinet 100 is used to exhibit at least one object 110. In particular, the exhibition cabinet 100 includes a plurality of shelf boards 120, and at least one object 110 is put on each shelf board 120. The information display device 200 is positioned on the exhibition cabinet 100. In particular, the information display device 200 is disposed on the front edge 122 of the shelf board 120.

Figure 2:
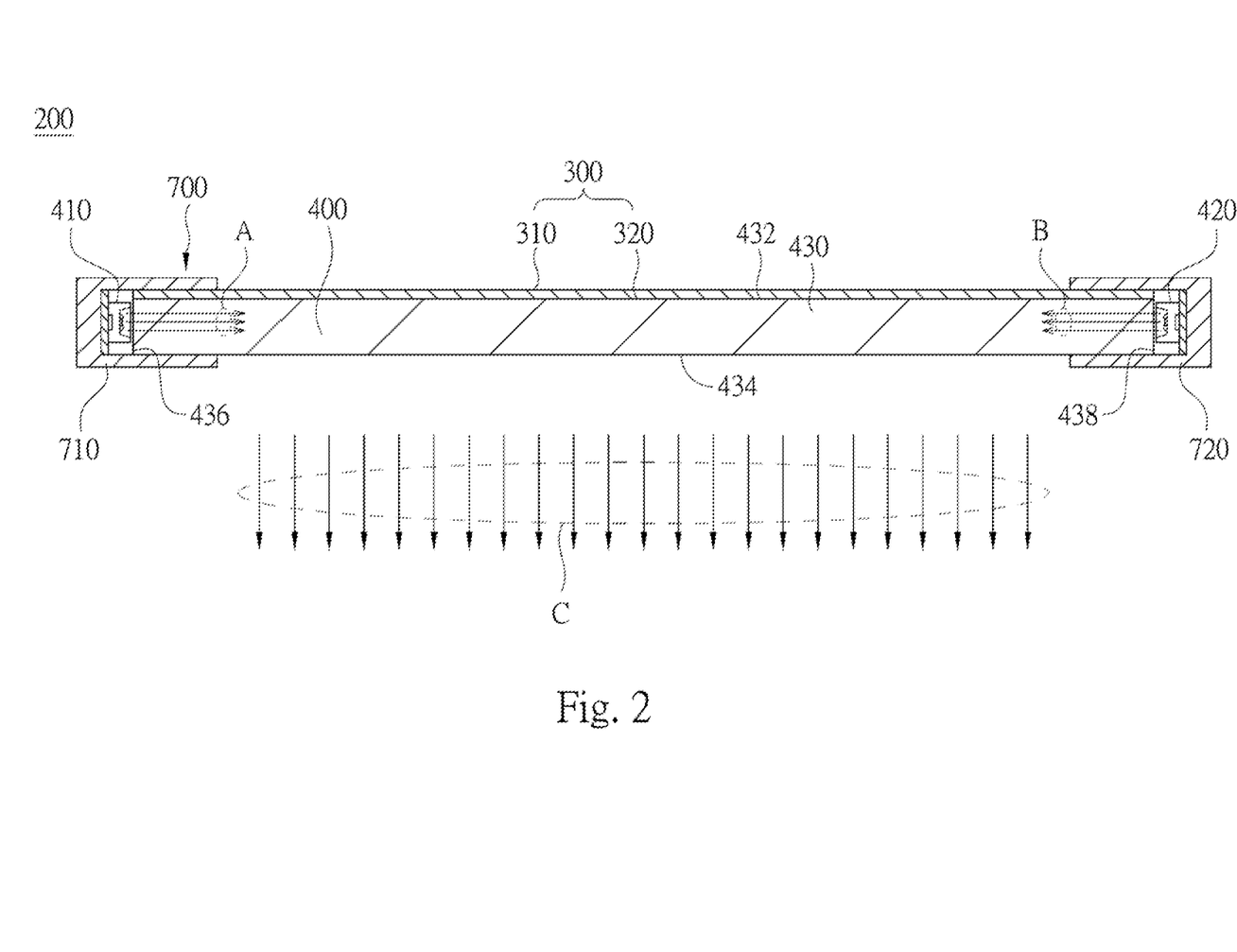
FIG. 2 is a cross-sectional view of the information display device taken along D-D' line in FIG. 1.

FIG. 2 is a cross-sectional view of the information display device 200 taken along D-D' line in FIG. 1. As shown in FIG. 2, the information display device 200 includes a display panel 300 and an illumination module 400. The display panel 300 has a front surface 310 and a back surface 320 opposite to the front surface 310. The front surface 310 is used to show information. The illumination module 400 is positioned on the back surface 320 of the display panel 300 for emitting a light into the display panel 300 through the back surface 320 and illuminating the object 110 (See FIG. 1) on the backside of the display panel 300. The information display device 200 includes a panel driving circuit (not shown in the figure) electrically connected to the display panel 300, so as to control the display panel 300 to show information.

Because the illumination module 400 of the information display device 200 not only provides lights to the display panel 300, but also provides lights to the object 110, only one illumination module 400 is required, and the display panel 300 and the object 110 can be illuminated, such that the cost and the power consumption can be reduced.

In some embodiments, the information exhibition system includes a frame 700 encompassing the edge of the illumination module 400 and exposing part of the illumination module 400. Hence, the light emitted by the illumination module 400 can illuminate the object 110, rather than being blocked by the frame 700. The frame 700 also encompasses the edge of the display panel 300, and exposes part of the display panel 300, so that the viewer can see the information shown by the display panel 300.

In some embodiments, the illumination module 400 includes a first light source 410 and a light guide plate 430. The light guide plate 430 has a first light outgoing surface 432, a second light outgoing surface 434, a first lateral light incident surface 436 and a second lateral light incident surface 438. The first light outgoing surface 432 is adjacent to the back surface 320 of the display panel 300. In other words, the first light outgoing surface 432 is in contact with the back surface 320 of the display panel 300. The second light outgoing surface 434 is opposite to the first light outgoing surface 432. In other words, the first light outgoing surface 432 and the second light outgoing surface 434 are respectively positioned on opposite sides of the light guide plate 430, such as the top and the bottom side of the light guide plate 430. The first lateral light incident surface 436 is adjacent to the first light outgoing surface 432 and the second light outgoing surface 434. In other words, the first lateral light incident surface 436 is positioned between the first light outgoing surface 432 and the second light outgoing surface 434. The second lateral light incident surface 438 is adjacent to the first light outgoing surface 432 and the second light outgoing surface 434. In other words, the second lateral light incident surface 438 is also positioned between the first light outgoing surface 432 and the second light outgoing surface 434. The second lateral light incident surface 438 and the first lateral light incident surface 436 are parallel and opposite to each other. The first light outgoing surface 432, the first lateral light incident surface 436, the second light outgoing surface 434 and the second lateral light incident surface 438 are adjacently connected sequentially, and they cooperatively constitute a substantial rectangle in the cross-sectional view.

The first light source 410 is disposed on the first lateral light incident surface 436, such that the first lights A are emitted into the light guide plate 430 through the first lateral light incident surface 436, and respectively go out of the first light outgoing surface 432 and the second light outgoing surface 434. Then, the first lights A respectively go to the back surface 320 of the display panel 300 through the first light outgoing surface 432 and form the illumination light C through the second light outgoing surface 434 for illuminating the object 110 (See FIG. 1).

The frame 700 includes a plurality of frame arms 710 and 720. The frame arms 710 and 720 encompass edges of the display panel 300 and the light guide plate 430, and expose part of the display panel 300 and the light guide plate 430. As such, after the first lights A emitted by the first light source 410 go through the first lateral light incident surface 436, some of the first lights A can go out of the second light outgoing surface 434, thereby forming the illumination lights C. In other words, the second light outgoing surface 434 of the light guide plate 430 opposite to the display panel 300 is exposed and not shaded by the opaque material, thereby allowing the illumination lights C to travel through.

In some embodiments, the information exhibition system includes a second light source 420. The second light source 420 is disposed on the second lateral light incident surface 438 of the light guide plate 430. The second lights B emitted by the second light source 420 go to the light guide plate 430 through the second lateral light incident surface 438. A part of the second lights B and another part of the second lights B respectively go out of the first light outgoing surface 432 and the second light outgoing surface 434. Then, these two parts of the second lights B respectively go to the back surface 320 of the display panel 300 through the first light outgoing surface 432 and form the illumination lights C through the second light outgoing surface 434, so as to illuminate the object 110 (See FIG. 1). In other words, the first light source 410 and the second light source 420 are disposed on opposite sides of the light guide plate 430, such as the left and right sides of the light guide plate 430, and they can cooperatively emit lights to the light guide plate 430, so as to provide lights to the display panel 300 and to illuminate the object 110. In comparison with the illumination module 400 only employing the first light source 410 or the second light source 420, the illumination module 400 employing both the first light source 410 and the second light source 420 can provide more lights.

In some embodiments, the frame 700 accommodates the display panel 300, the light guide plate 430, the first light source 410 and/or the second light source 420. At least part of the light guide plate 430 is exposed out of the frame 700, such that the first light source 410 and the second light source 420 cooperatively form the illumination lights C.

Figure 3:
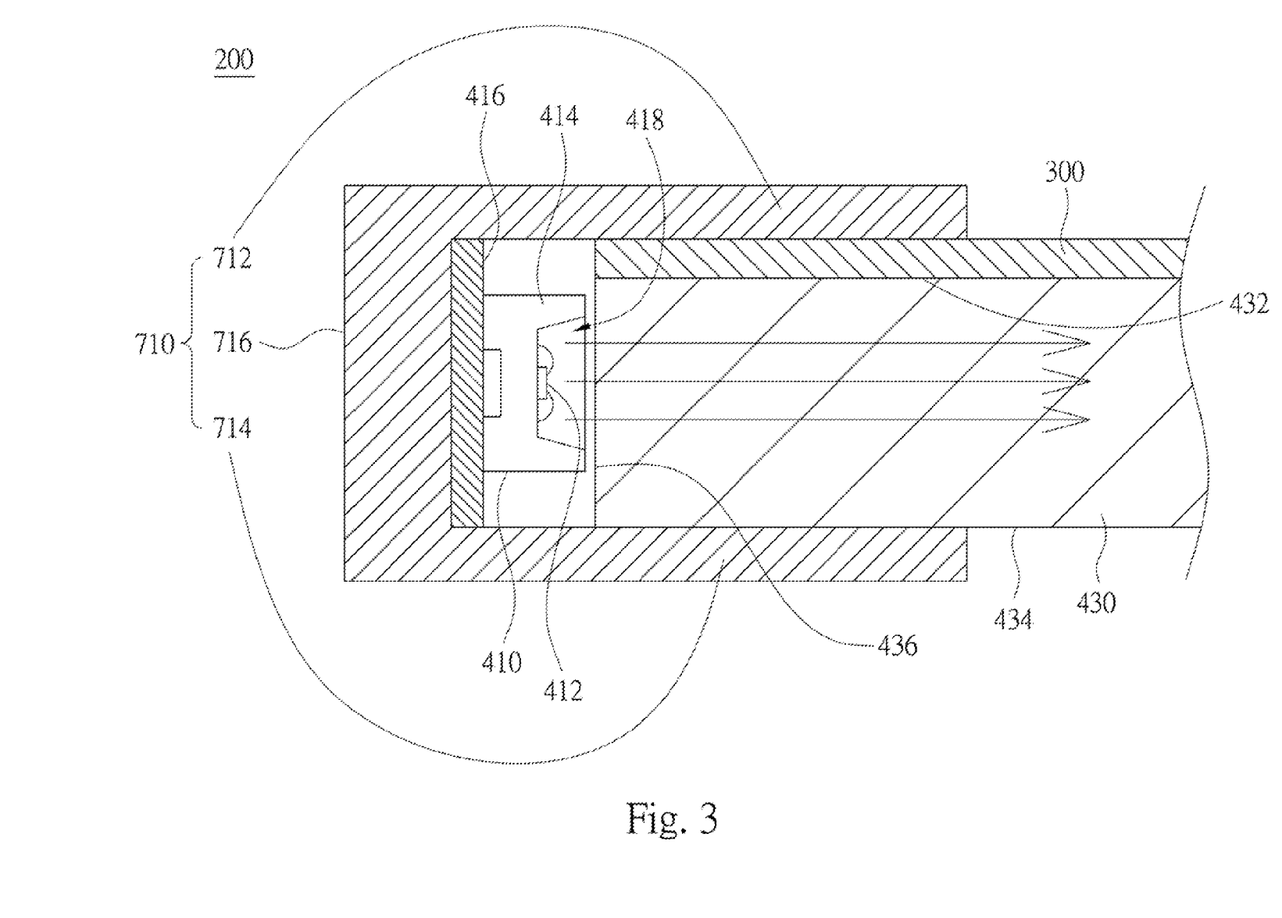
FIG. 3 is a fragmentary cross-sectional view of the information display device in FIG. 2.

FIG. 3 is a fragmentary cross-sectional view of the information display device 200 in FIG. 2. As shown in FIG. 3, the first light source 410 includes an LED 412, a reflective cup 414 and a substrate 416. The reflective cup 414 is disposed on the substrate 416. The reflective cup 414 has an accommodating recess 418. The accommodating recess 418 is concave on the surface of the reflective cup 414 toward the light guide plate 430. The LED 412 is disposed in the accommodating recess 418 to emit lights to the light guide plate 430. The accommodating recess 418 can be alternatively filled with encapsulation glue. The encapsulation glue can be alternatively doped with the wavelength-conversion material, such as the phosphor, the pigment or the dye. The first light source 410 includes an LED driving circuit (not shown) electrically connected to the LED 412 for driving the LED 412.

The frame arm 710 includes a top plate 712, a bottom plate 714 and a lateral plate 716. The top plate 712, the lateral plate 716 and the bottom plate 714 are connected sequentially, and cooperatively constitute an U-shaped structure for sandwiching the lateral sides of the display panel 300 and the light guide plate 430. In particular, the top plate 712 presses against the front surface 310 of the display panel 300, and the bottom plate 714 presses against the second light outgoing surface 434 of the light guide plate 430. Therefore, the top plate 712 and the bottom plate 714 can cooperatively sandwich lateral sides of the display panel 300 and the light guide plate 430. The substrate 416 of the first light source 410 presses against the lateral plate 716.

Figure 4:
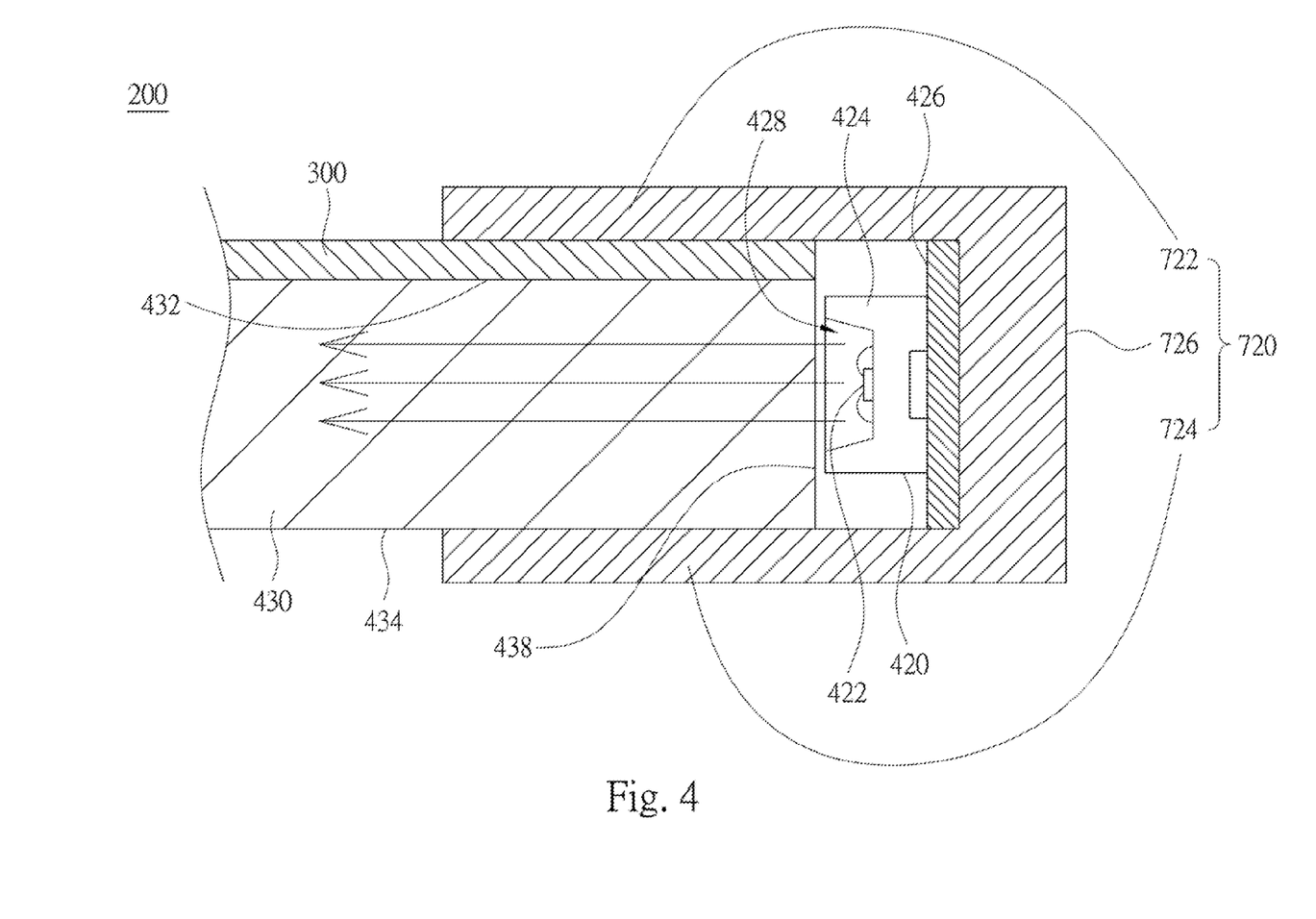
FIG. 4 is another fragmentary cross-sectional view of the information display device in FIG. 2.

FIG. 4 is another fragmentary cross-sectional view of the information display device 200 in FIG. 2. As shown in FIG. 4, the second light source 420 includes an LED 422, a reflective cup 424 and a substrate 426. The reflective cup 424 is disposed on the substrate 426. The reflective cup 424 has an accommodating recess 428. The accommodating recess 428 is concave on the surface of the reflective cup 424 toward the light guide plate 430. The LED 422 is disposed in the accommodating recess 428 to emit lights to the light guide plate 430. The accommodating recess 428 can be alternatively filled with encapsulation glue. The encapsulation glue can be alternatively doped with the wavelength-conversion material, such as the phosphor, the pigment or the dye. The first light source 420 includes an LED driving circuit (not shown) electrically connected to the LED 422 for driving the LED 422.

The frame arm 720 includes a top plate 722, a bottom plate 724 and a lateral plate 726. The top plate 722, the lateral plate 726 and the bottom plate 724 are connected sequentially, and cooperatively constitute an U-shaped structure for sandwiching another lateral sides of the display panel 300 and the light guide plate 430. In particular, the top plate 722 presses against the front surface 310 of the display panel 300, and the bottom plate 724 presses against the second light outgoing surface 434 of the light guide plate 430. Therefore, the top plate 722 and the bottom plate 724 can cooperatively sandwich another lateral sides of the display panel 300 and the light guide plate 430. The substrate 426 of the second light source 420 presses against the lateral plate 726.

Referring to FIG. 2, the frame arm 710 and the frame arm 720 can be U-shaped structures with recesses facing to each other, and they respectively sandwich the opposite lateral sides of the display panel 300 and the light guide plate 430.

In some embodiments, the display panel 300 can be, but is not limited to be, a LCD panel. In some embodiments, the LED 412 (See FIG. 3) and the LED 422 (See FIG. 4) can be, but is not limited to be, a red LED, a green LED, a blue LED, a white LED or a yellow LED.

Figure 5:
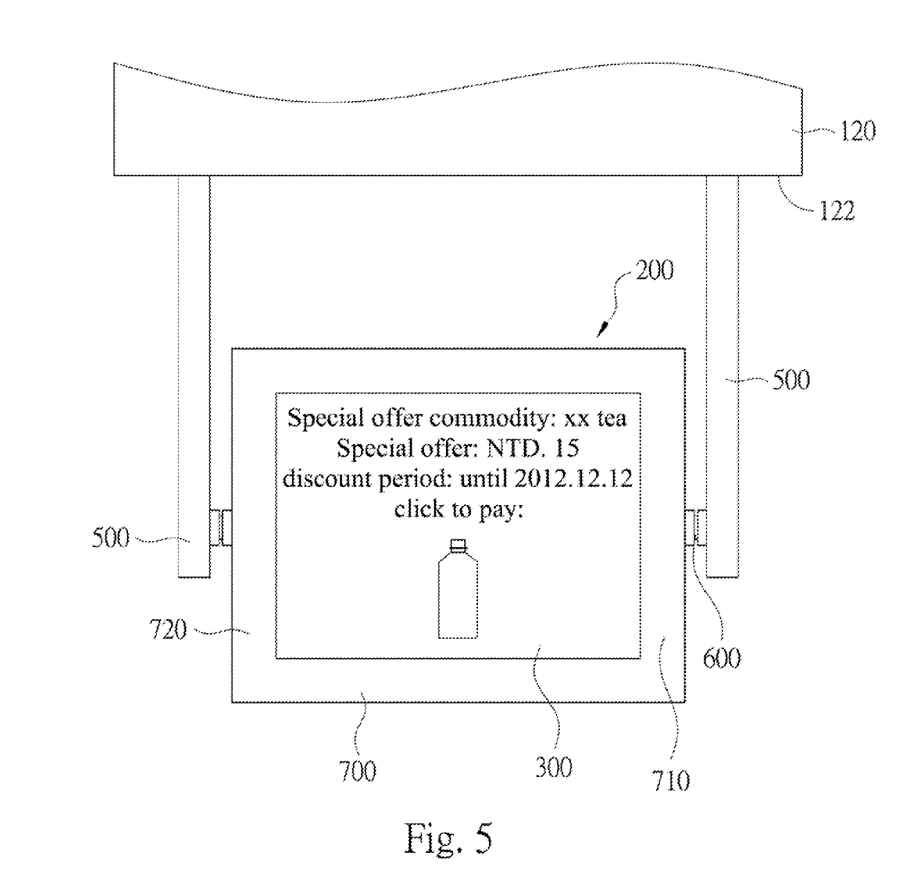
FIG. 5 is a top view of the information display device in FIG. 1.

FIG. 5 is a top view of the information display device 200 in FIG. 1. As shown in this figure, in some embodiments, the information exhibition system includes at least one securing device 500 connected to the information display device 200 for securing the information display device 200 on the exhibition cabinet. In particular, one end of the securing device 500 is connected to the front edge 122 of the shelf board 120, and another end is connected to the information display device 200. Hence, the information display device 200 can be stably secured at the front edge 122 of the shelf board 120.

In some embodiments, the securing device 500 includes a shaft 600 connected to the frame arm 710 or 720 of the information display device 200, such that the information display device 200 is pivotally connected to the securing device 500. In particular, the shaft 600 is connected between the frame arm 710 and the end of the securing device 500 distal to the shelf board 120. Therefore, the information display device 200 can rotate relative to the securing device 500 by the rotation of the shaft 600, thereby modifying the direction of which the light goes to the object 110 (See FIG. 1).

Figure 6:
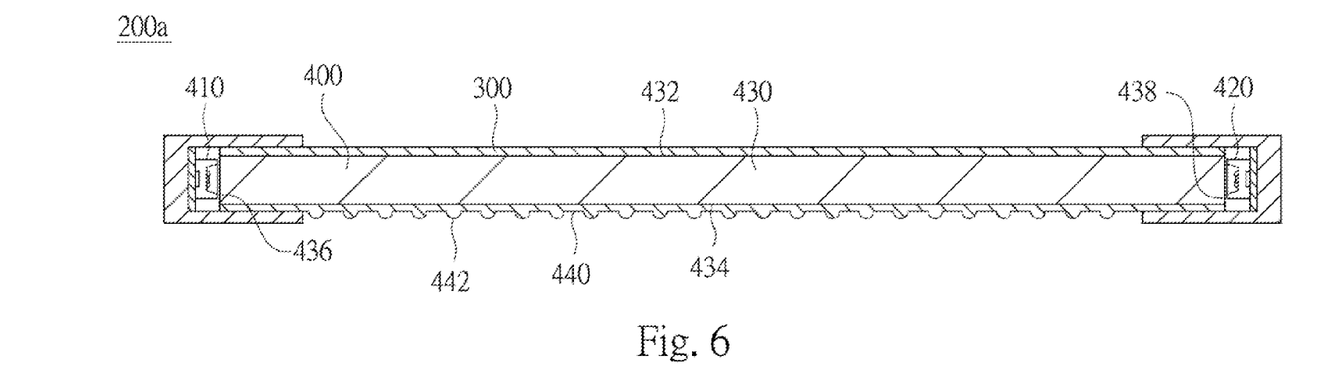
FIG. 6 is a cross-sectional view of the information display device in accordance with another embodiment of the present invention.

FIG. 6 is a cross-sectional view of the information display device 200a in accordance with another embodiment of the present invention. The main difference between this embodiment and FIG. 2 is that: the illumination module 400 in this embodiment includes an optical lens 440. The optical lens 440 covers the second light outgoing surface 434 of the light guide plate 430, so as to modify the light, such as diffusing or concentrating the light. For example, an uneven structure 442 can be disposed on a surface of the optical lens 440 to modify the optical path of the light. Other technical features in this embodiment are the same as shown in FIG. 2 and the related description above, and will not be described repeatedly.

Figure 7:
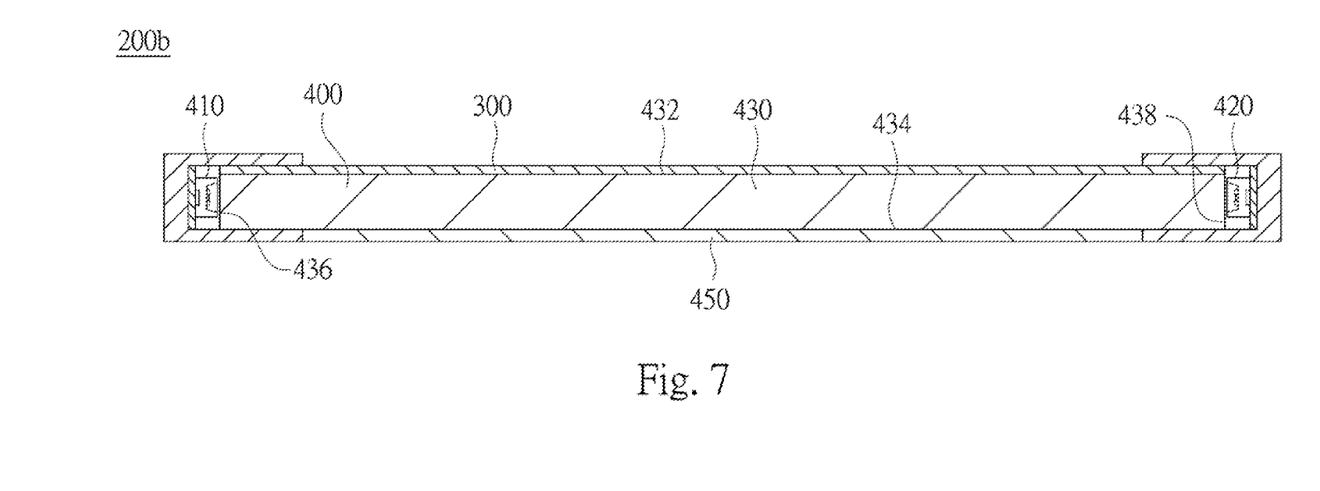
FIG. 7 is a cross-sectional view of the information display device in accordance with another embodiment of the present invention.

FIG. 7 is a cross-sectional view of the information display device 200b in accordance with another embodiment of the present invention. The main difference between this embodiment and FIG. 2 is that: the illumination module 400 in this embodiment includes a lampshade 450. The lampshade 450 covers the second light outgoing surface 434 of the light guide plate 430, so as to modify the light (such as softening the light) or to protect the light guide plate 430. Other technical features in this embodiment are the same as shown in FIG. 2 and the related description above, and will not be described repeatedly.

Figure 8:
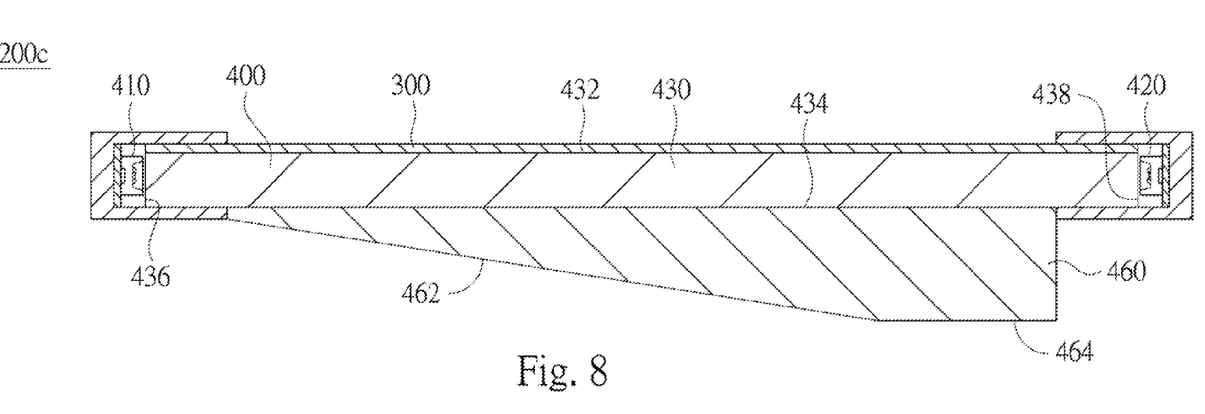
FIG. 8 is a cross-sectional view of the information display device in accordance with another embodiment of the present invention.

FIG. 8 is a cross-sectional view of the information display device 200c in accordance with another embodiment of the present invention. The main difference between this embodiment and FIG. 7 is that: the lampshade 460 in this embodiment has the shape different from the lampshade 450 in FIG. 7. In particular, the lampshade 460 includes a slanted surface 462 and a horizontal surface 464 connected to the slanted surface 462. Because the lampshade 460 is not a flat plate, it can be used to modify the direction of the light (such as modifying the light toward the object). Other technical features in this embodiment are the same as shown in FIG. 2 and the related description above, and will not be described repeatedly.

Figure 9:
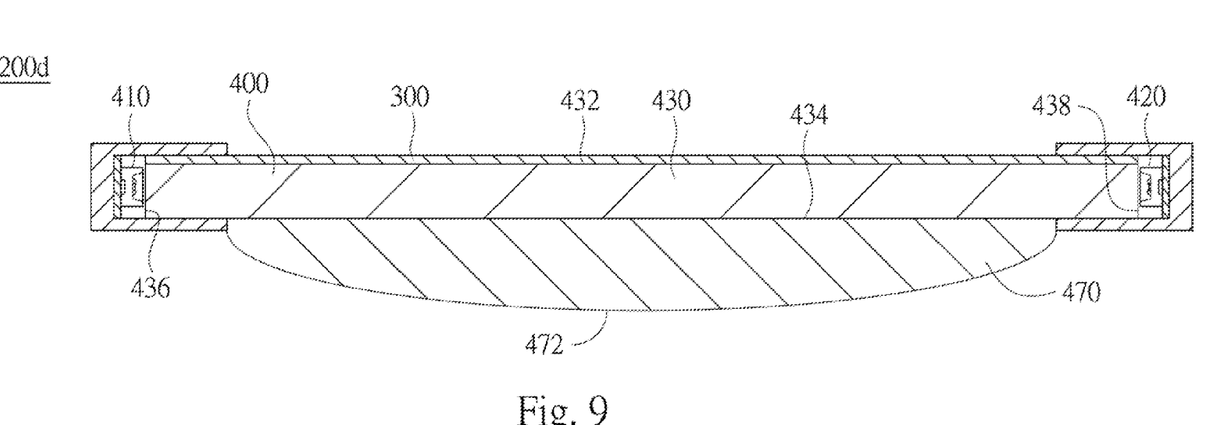
FIG. 9 is a cross-sectional view of the information display device in accordance with another embodiment of the present invention.

FIG. 9 is a cross-sectional view of the information display device 200d in accordance with another embodiment of the present invention. The main difference between this embodiment and FIG. 8 is that: the lampshade 470 has the shape different from the lampshade 460 in FIG. 8. In particular, the lampshade 470 has a curved surface 472 which can concentrate or diffuse the light. Other technical features in this embodiment are the same as shown in FIG. 2 and the related description above, and will not be described repeatedly.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An information exhibition system, comprising:
an exhibition cabinet used to exhibit at least one object; and
an information display device positioned on the exhibition cabinet, the information display device comprising:
a display panel having a front surface and a back surface opposite to the front surface, wherein the front surface is used to show information;
an illumination module positioned on the back surface of the display panel for emitting a light into the display panel through the back surface and illuminating the object on the backside of the display panel;
a light guide plate having a first light outgoing surface, a second light outgoing surface opposite to the first light outgoing surface, and a first lateral light incident surface adjacent to the first light outgoing surface and the second light outgoing surface, wherein the first light outgoing surface is adjacent to the back surface of the display panel; and
a first light source disposed on the first lateral light incident surface for emitting first lights into the light guide plate through the first lateral light incident surface, so that the first lights are respectively emitted out of the first light outgoing surface and the second light outgoing surface, and respectively go to the back surface of the display panel through the first light outgoing surface and to the object on the backside of the display panel through the second light outgoing surface.

2. The information exhibition system of claim 1, wherein the display panel is a LCD (liquid crystal display) panel.

3. The information exhibition system of claim 1, wherein the first light source comprises an LED (light emitting diode).

4. The information exhibition system of claim 1, further comprising a second light source disposed on a second lateral light incident surface of the light guide plate, wherein the second lateral light incident surface is adjacent to the first light outgoing surface and the second light outgoing surface, wherein the second lateral light incident surface and the first lateral light incident surface are opposite and parallel to each other, such that second lights emitted by the second light source enter into the light guide plate through the second lateral light incident surface, and a part of the second lights and another part of the second lights respectively go to the back surface of the display panel through the first light outgoing surface and to the object on the backside of the display panel through the second light outgoing surface.

5. The information exhibition system of claim 4, wherein the second light source comprises an LED.

6. The information exhibition system of claim 4, further comprising a frame accommodating the display panel, the light guide plate, the first light source and the second light source.

7. The information exhibition system of claim 6, wherein the frame comprises a plurality of frame arms encompassing edges of the display panel and the light guide plate.

8. The information exhibition system of claim 7, further comprising:
  at least one securing device connected to the information display device for securing the information display device on the exhibition cabinet.

9. The information exhibition system of claim 8, wherein the securing device comprises a shaft connected to the frame arm of the information display device, such that the information display device is pivotally connected to the securing device.

10. The information exhibition system of claim 9, wherein the illumination module comprises an optical lens covering the second light outgoing surface of the light guide plate.

11. The information exhibition system of claim 10, further comprising an uneven structure disposed on a surface of the optical lens.

12. The information exhibition system of claim 9, wherein the illumination module comprises a lampshade covering the second light outgoing surface of the light guide plate.

* * * * *